US012642172B2

(12) United States Patent
Longueville et al.

(10) Patent No.: US 12,642,172 B2
(45) Date of Patent: Jun. 2, 2026

(54) MECHANISM FOR HORIZONTAL POSITIONING OF GPS MODULE IN FIELD AND ROAD MODE

(71) Applicant: CNH Industrial Belgium N.V., Zedelgem (BE)

(72) Inventors: Stefan Longueville, Maldegem (BE); Ruben Vancoillie, Meulebeke (BE)

(73) Assignee: CNH Industrial Belgium N.V. (BE)

( * ) Notice: Subject to any disclaimer, the term of this patent is extended or adjusted under 35 U.S.C. 154(b) by 367 days.

(21) Appl. No.: 18/543,132

(22) Filed: Dec. 18, 2023

(65) Prior Publication Data

US 2024/0196789 A1     Jun. 20, 2024

(30) Foreign Application Priority Data

Dec. 19, 2022    (EP) ..................................... 22214763

(51) Int. Cl.
| | |
|---|---|
| *A01D 41/12* | (2006.01) |
| *A01D 41/127* | (2006.01) |
| *H01Q 1/12* | (2006.01) |
| *H01Q 1/32* | (2006.01) |

(52) U.S. Cl.
CPC ....... *A01D 41/1226* (2013.01); *A01D 41/127* (2013.01)

(58) Field of Classification Search
CPC .............. A01D 41/1226; A01D 41/127; A01D 41/1208; A01D 41/12; G01S 19/36; H01Q 1/18; H01Q 1/3275; H01Q 1/3233; H01Q 1/3258; H01Q 1/3291; H01Q 1/32; H01Q 1/325; H01Q 1/3208
See application file for complete search history.

(56) References Cited

U.S. PATENT DOCUMENTS

| | | |
|---|---|---|
| 6,679,772 B2 | 1/2004 | Johnson et al. |
| 8,393,137 B1 * | 3/2013 | Crosby ............... A01F 15/0825 |
| | | 701/50 |
| 9,215,843 B2 | 12/2015 | Cooksey et al. |
| (Continued) | | |

FOREIGN PATENT DOCUMENTS

| | | |
|---|---|---|
| CN | 212464067 U | 2/2021 |
| EP | 3243373 A1 | 11/2017 |
| (Continued) | | |

OTHER PUBLICATIONS

Extended European Search Report for European Application No. 22214763.9, dated May 31, 2023, 9 pages.

*Primary Examiner* — Joseph M Rocca
*Assistant Examiner* — Robert E Pezzuto
(74) *Attorney, Agent, or Firm* — Buchanan Ingersoll & Rooney PC

(57)     ABSTRACT

A mounting mechanism for a signal-receiving module for an agricultural harvester includes a folding four-bar linkage having a ground link fixed to the folding cover of a grain tank. The mechanism holds the signal receiving module in a horizontal position at the highest position above the agricultural harvester when the grain tank cover is in the both the open and closed positions. Also, a kit for mounting a signal-receiving module to a folding grain tank cover on an agricultural harvester, a grain tank for an agricultural harvester including the mounting mechanism, and an agricultural harvester including the mounting mechanism.

15 Claims, 9 Drawing Sheets

(56) References Cited

U.S. PATENT DOCUMENTS

| | | | |
|---|---|---|---|
| 9,736,982 B2 | 8/2017 | Steen | |
| 10,135,111 B2 * | 11/2018 | Albano | ................ H01Q 1/3275 |
| 2020/0251809 A1 | 8/2020 | Hanada | |
| 2020/0340285 A1 | 10/2020 | Mussack et al. | |

FOREIGN PATENT DOCUMENTS

| | | | |
|---|---|---|---|
| JP | 05343913 | A | 12/1993 |
| JP | 2004138484 | A | 5/2004 |
| WO | 2015069993 | A2 | 5/2015 |
| WO | 2018139143 | A1 | 8/2018 |

* cited by examiner

MECHANISM FOR HORIZONTAL POSITIONING OF GPS MODULE IN FIELD AND ROAD MODE

CROSS REFERENCE TO RELATED APPLICATION

This application claims priority to European Application No. 22214763.9, filed Dec. 19, 2022, the content of such application being incorporated by reference herein in its entirety.

FIELD OF THE INVENTION

The present invention relates to agricultural harvesters, and, more specifically to the mounting of a global positioning system (GPS) module upon an agricultural harvester to facilitate good satellite reception.

BACKGROUND OF THE INVENTION

An agricultural harvester known as a "combine" is historically termed such because it combines multiple harvesting functions with a single harvesting unit, such as picking, threshing, separating and cleaning. A combine includes a header that removes the crop from a field, and a feeder housing that transports the crop matter into a threshing rotor. The threshing rotor rotates within a perforated housing, which may be in the form of adjustable concaves, and performs a threshing operation on the crop to remove the grain. Once the grain is threshed, it falls through perforations in the concaves onto a grain pan. From the grain pan, the grain is cleaned using a cleaning system and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; an unloading system on the combine is actuated to transfer the grain into the vehicle.

More particularly, a rotary threshing or separating system includes one or more rotors, which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Grain tanks for combines are fitted with covers and/or extensions at the top of the upstanding walls. Extensions allow the capacity of the grain tank to be increased during harvesting, while a cover prevents the harvested grain from spilling over as the tank becomes full and the combine encounters bumps, dips, sloped ground surfaces, etc. The covers and/or extensions may be manual or powered, e.g., electrically, hydraulically or pneumatically powered. The extensions can be moved to the raised position for increased capacity during harvesting and to a lowered position for road transport, for which height is typically limited to a maximum value (e.g., four meters) as dictated by a governmental homologation rules for safe passage on public roads, under bridges, and/or utility wires.

Combines also are provided with global positioning system (GPS or other satellite constellation systems, e.g., GNSS) receivers to enable the use of position tracking for a variety of harvester control functions. Uninterrupted and accurate functioning of the GPS module requires negligible interference with GPS signal reception by obstructing parts of the combine and maintenance of the GPS module in a horizontal position, i.e., in a plane tangential to the earth's surface. To ensure an unobstructed, 360-degree view of the satellite constellation, GPS antennae or modules are mounted on the highest point of the combine, above any part of the machinery that might obstruct a line of sight to a satellite, for example, on top of the cab or the grain storage tank. Problems can occur maintaining ideal GPS module positioning and signal reception, particularly in northern latitudes, where signal paths to satellites may be flatter, and during harvesting operations, when the grain tank covers are lifted and extensions are deployed.

There remains a need in the art for an improved mount for a GPS module for an agricultural harvester that maintains the module in an optimal operating position during field mode with the grain tank cover open and extensions deployed, as well as during road mode with the grain tank cover closed and the extensions retracted. Such a need is satisfied by the present mounting mechanism, kit, and grain tank for an agricultural combine.

SUMMARY OF THE INVENTION

According to one aspect of the invention, a mounting mechanism for a signal-receiving module for an agricultural harvester includes a folding four-bar linkage having a ground link, a coupler link, a first crank link, and a second crank link that is shorter than the first crank link. The ground link is joined at a first end by a pivot joint to a first end of the first crank link and at an opposite end by a pivot joint to a first end of the second crank link. The ground link is configured to be fixed to the folding cover of a grain tank of the agricultural harvester. The coupler link is joined at a first end by a pivot joint to an opposite end of the first crank link and at an opposite end by a pivot joint to an opposite end of the second crank link. The coupler link includes a platform configured to hold the signal-receiving module. One of either the first crank link or the second crank link includes a lever extending past the pivot joint joining the crank link to the ground link. The lever is configured to contact a fixed surface on the agricultural harvester to force the mechanism into a folded position from a deployed position as the grain tank cover is moved from an open position to a closed position. The mechanism in the deployed (open) position holds the signal-receiving module in a horizontal position above the grain tank cover when the grain tank cover is in the open position; in the folded position, the mechanism holds the signal-receiving module in a horizontal position above the grain tank cover when the grain tank cover is in the closed position.

In another aspect of the invention, the signal-receiving module is a GPS module or a GNSS module.

In another aspect of the invention, the mounting mechanism includes an actuator configured to force the mechanism into an open position from the folded position as the grain tank cover is moved from a closed position to an open position. The actuator can be a spring, or a hydraulic actuator.

In another aspect of the invention, a kit includes the mounting mechanism and a stop including the fixed surface, the stop being configured for fixation to the agricultural harvester in a position such that the lever contacts the fixed surface as the grain tank cover is moved from an open position to a closed position. The piece may be an angled bracket configured to be fixed to a side of the grain tank.

In another aspect of the invention, a grain tank for an agricultural harvester includes the mounting mechanism fixed to a folding cover of a grain tank and a signal-receiving module mounted on the platform. The signal-receiving module can be a GPS module or a GNSS module. The mounting mechanism can include an actuator configured to force the mechanism into an open position from the folded position as the grain tank cover is moved from a closed position to an open position. The actuator can be a gas strut, a spring, or a hydraulic actuator.

In another aspect of the invention, an agricultural harvester having a grain storage tank with a folding grain tank cover includes a mounting mechanism for a signal-receiving module for the agricultural harvester fixed to the cover. The mechanism includes a folding four-bar linkage having a ground link, a coupler link, a first crank link, and a second crank link that is shorter than the first crank link. The ground link is joined at a first end by a pivot joint to a first end of the first crank link and at an opposite end by a pivot joint to a first end of the second crank link. The ground link is configured to be fixed to the folding cover of a grain tank of the agricultural harvester. The coupler link is joined at a first end by a pivot joint to an opposite end of the first crank link and at an opposite end by a pivot joint to an opposite end of the second crank link. The coupler link includes a platform configured to hold the signal-receiving module. One of either the first crank link or the second crank link includes a lever extending past the pivot joint joining the crank link to the ground link. The lever is configured to contact a fixed surface on the agricultural harvester to force the mechanism into a folded position from a deployed position as the grain tank cover is moved from an open position to a closed position. The mechanism in the deployed (open) position holds the signal receiving module in a horizontal position above the grain tank cover when the grain tank cover is in the open position; in the folded position, the mechanism holds the signal receiving module in a horizontal position above the grain tank cover when the grain tank cover is in the closed position.

In another aspect of the invention, the agricultural harvester includes a signal-receiving module that is a GPS module or a GNSS module.

In another aspect of the invention, the mounting mechanism on the agricultural harvester has an actuator configured to force the mechanism into an open position from the folded position as the grain tank cover is moved from a closed position to an open position. The actuator can be a gas strut, a spring, or a hydraulic actuator.

In another aspect of the invention, a stop including the fixed surface is fixed to the agricultural harvester in a position such that the lever contacts the fixed surface as the grain tank cover is moved from an open position to a closed position, urging the mounting mechanism into a folded (closed) position.

DETAILED DESCRIPTION OF THE PREFERRED EMBODIMENTS

Figure 1:
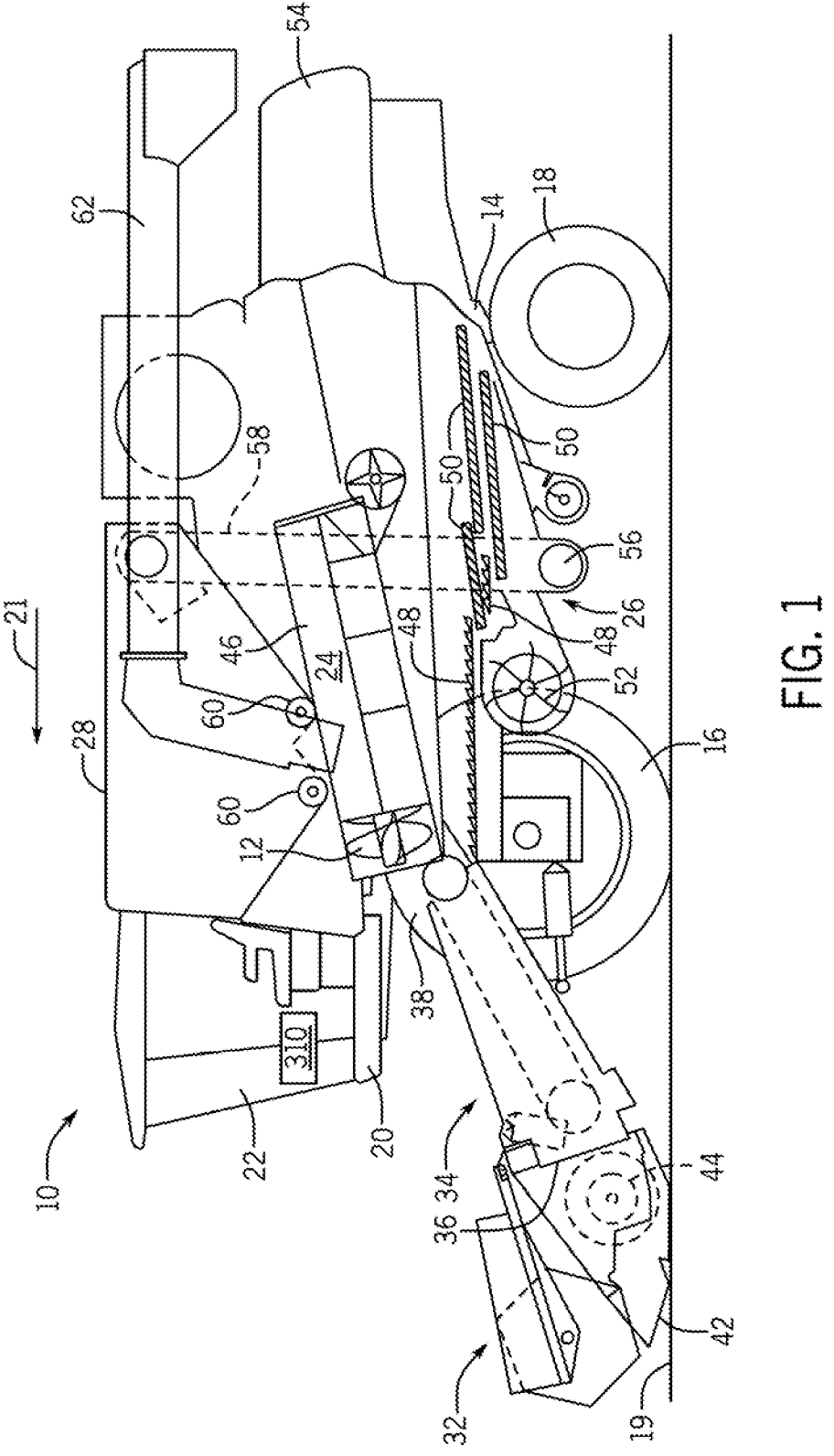
FIG. 1 is a side view of an agricultural harvester.

Reference now will be made in detail to embodiments of the invention, one or more examples of which are illustrated in the drawings. Each example is provided by way of explanation of the invention, not limitation of the invention. It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural harvesters and, more specifically, to the mounting of a global positioning system (GPS) module upon an agricultural harvester to facilitate good satellite reception. The agricultural harvester includes a grain storage tank that is configured to receive harvested grains and that has folding covers and side wall extensions. A folding mounting mechanism for a GPS module is fixed on a folding cover of the grain storage tank. The mounting mechanism is configured to maintain the GPS module in a horizontal position on the highest point of the harvester, free of interference from any harvester machine parts, both in travel (road) mode with the grain tank covers and extensions folded in a closed position and in harvest (field) mode with the grain tanks covers and extensions in an open (deployed) position.

The terms "grain" and "residue" are used principally throughout this specification for convenience but it is to be understood that these terms are not intended to be limiting. The terms "grain" and "crop material" are used throughout the specification for convenience, and it should be understood that these terms are not intended to be limiting. "Grain" refers generally to the part of the grain material that is threshed and separated from the discardable part of the grain material, which is referred to as non-grain grain material, or material other than grain (MOG). "Residue" refers to MOG that is to be discarded from the combine. Thus, "grain" refers to the part of a crop that is harvested and separated from discardable portions of the crop material.

The terms "fore", "aft", "left," and "right", when used in connection with the agricultural harvester (e.g. combine) and/or components thereof are usually determined with reference to the direction of forward operative travel 21 of the combine, but again, they should not be construed as limiting. Additionally, the term "a," as used in the specification, means "at least one." The terminology includes the words above specifically mentioned, derivatives thereof, and words of similar import.

Referring now to the drawings, and more particularly to FIG. 1, there is shown one embodiment of an agricultural harvester combine 10, which generally includes a chassis or frame 14, ground engaging wheels 16 and 18, a header 32, a feeder housing 34, an operator cab 22 with floor 20, a threshing and separating system 24, a cleaning system 26, and a grain bin 28. Front wheels 16 are larger flotation type wheels, and rear wheels 14 are smaller steerable wheels. Although combine 10 is shown as including wheels, is also to be understood that combine 10 may include tracks, such as full tracks or half-tracks. Header 32 and associated feeder 34 may extend in the forward direction 21 forward of the main frame 14 and may be pivotally secured thereto for generally vertical movement.

In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the combine 10 to allow the front end 36 of the feeder 34 and, thus, the header 32 to be moved upwardly and downwardly relative to the ground 19 to set the desired harvesting or cutting height for the header 32.

As the combine 10 is propelled forwardly over a field with standing grain, the grain material is severed from the stubble by a sickle bar 42 at the front of the header 32 and delivered by a header auger 44 to the front end 36 of the feeder 34, which supplies the harvested grain to the threshing and separating assembly 24. As is generally understood, the threshing and separating assembly 24 may include a cylindrical chamber 46 in which the rotor 12 is rotated to thresh and separate the harvested grain received therein. That is, the harvested grain is rubbed and beaten between the rotor 12 and the inner surfaces of the chamber 46, whereby the grain, seed, or the like, is loosened and separated from the MOG.

The harvested grain which has been separated by the threshing and separating assembly 24 falls onto a series of pans 48 and associated sieves 50, with the separated harvested grain being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the harvested grain. For instance, the fan 52 may blow the impurities off of the harvested grain for discharge from the combine 10 through the outlet of a straw hood 54 positioned at the back end of the combine 10.

The cleaned harvested grain passing through the sieves 50 may then fall into a trough of an auger 56, which may be configured to transfer the harvested grain to an elevator 58 for delivery to the associated grain tank 28. Additionally, in one embodiment, a pair of tank augers 60 at the bottom of the grain tank 28 may be used to urge the cleaned harvested grain sideways to an unloading tube 62 for discharge from the combine 10.

A combine controller 310 is also included in the combine. The combine controller may be a programmable logic controller, micro-controller, etc. The combine controller is programmable by the operator of the combine through a user (e.g. operator) interface, or through a remote computer (not shown). The operator, for example, enters commands through the user interface. In response to these commands, the controller sends control signals to the various actuators of combine 10. More details of combine controller 310 are described with reference to FIG. 3.

It should be appreciated that the configuration of the combine 10 described above and shown in FIG. 1 is provided only to place the present subject matter in an exemplary field of use. Thus, it should be appreciated that the present subject matter may be readily adaptable to any manner of combine configuration.

Figure 2:
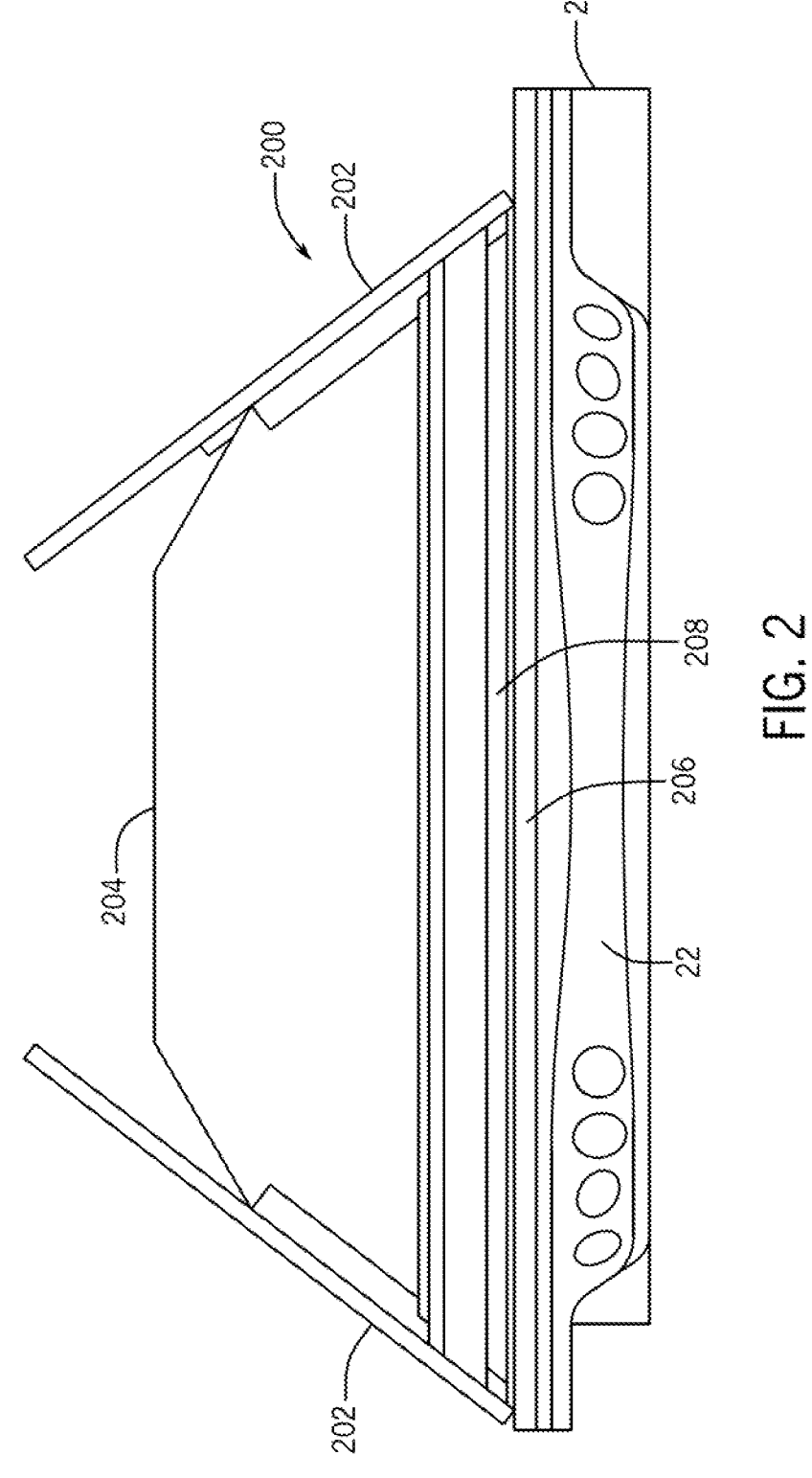
FIG. 2 is a front view of a grain storage tank of an agricultural harvester having a folding cover and side extensions in an open (deployed) position.

Referring now to FIG. 2, grain storage tank 28 of the agricultural harvester combine 10 has a pair of folding covers 202 and side extensions 204 shown in an open (deployed) position 200. The covers 202 typically represents the highest or one of the highest points on the combine 10 relative to a surface 19 (FIG. 1) such as the ground or a road surface on which the combine 10 is located. This height is typically limited to a maximum value, for example, four meters, as dictated by a governmental entity for safe passage on public roads, under bridges, and/or utility wires. However, such a maximum height poses a difficulty insofar as it thus limits the height and, thus, the grain holding capacity of the grain tank 28. As a result, particularly when harvesting operations are being carried out in very large fields, in the absence of an extension, the grain tank 28 may fill to its capacity before a section of a crop field being harvested has been completed, or when the combine 10 is at a location within a field far from a grain truck or wagon into which the grain is to be unloaded, such that the harvesting operations must be undesirably interrupted, for a longer than desired time, for the unloading of the grain tank, which actions may require significant time expenditures to drive the combine 10 to the unloading location, to unload it, and to then return it to the harvesting location.

To avoid the above-discussed problems, grain tank 28 of combine 10 includes a foldable extensions 204, foldable between a deployed or unfolded position 200 extending upwardly from grain tank 28 for substantially increasing the grain holding capacity thereof, and a folded or closed or stored position 1400 (FIG. 14) so as to be more easily capable of meeting overall height limitations of the combine 10 for travel over public roads and the like. Foldable extension 204 has a generally horizontal lower edge portion positioned generally along the upper edge 206 of a vertical wall of grain tank 28, such as by a pivot assembly or joint 208, to be rotatable about an axis of rotation generally along or adjacent to such vertical wall edge 206. Pivot assembly or joint 208 can take many suitable forms, including a rotatable shaft or tube operatively associated with or connected to the extension 204, or any suitable hinge or hinge-type device, such as a plastic living hinge, a piano hinge, multiple hinges, or other suitable hinging or pivoting elements, operable to enable pivotal movement of extension 204 between a deployed position 200 (FIGS. 2, 7, 9-13) and a folded position as generally shown in FIG. 14, discussed hereinafter.

Grain tank extension mechanisms also are described, for example, in U.S. Pat. Nos. 9,736,982, 9,215,843, and 6,679, 772, the entire disclosures of which are incorporated by reference herein. Deployment of such mechanisms may be manual or automated. It should be appreciated that many alternative forms of could be equally employed to achieve desired results, and that the grain tank extension of the type herein described is but one of many possible embodiments that would be acceptable.

Figure 3:
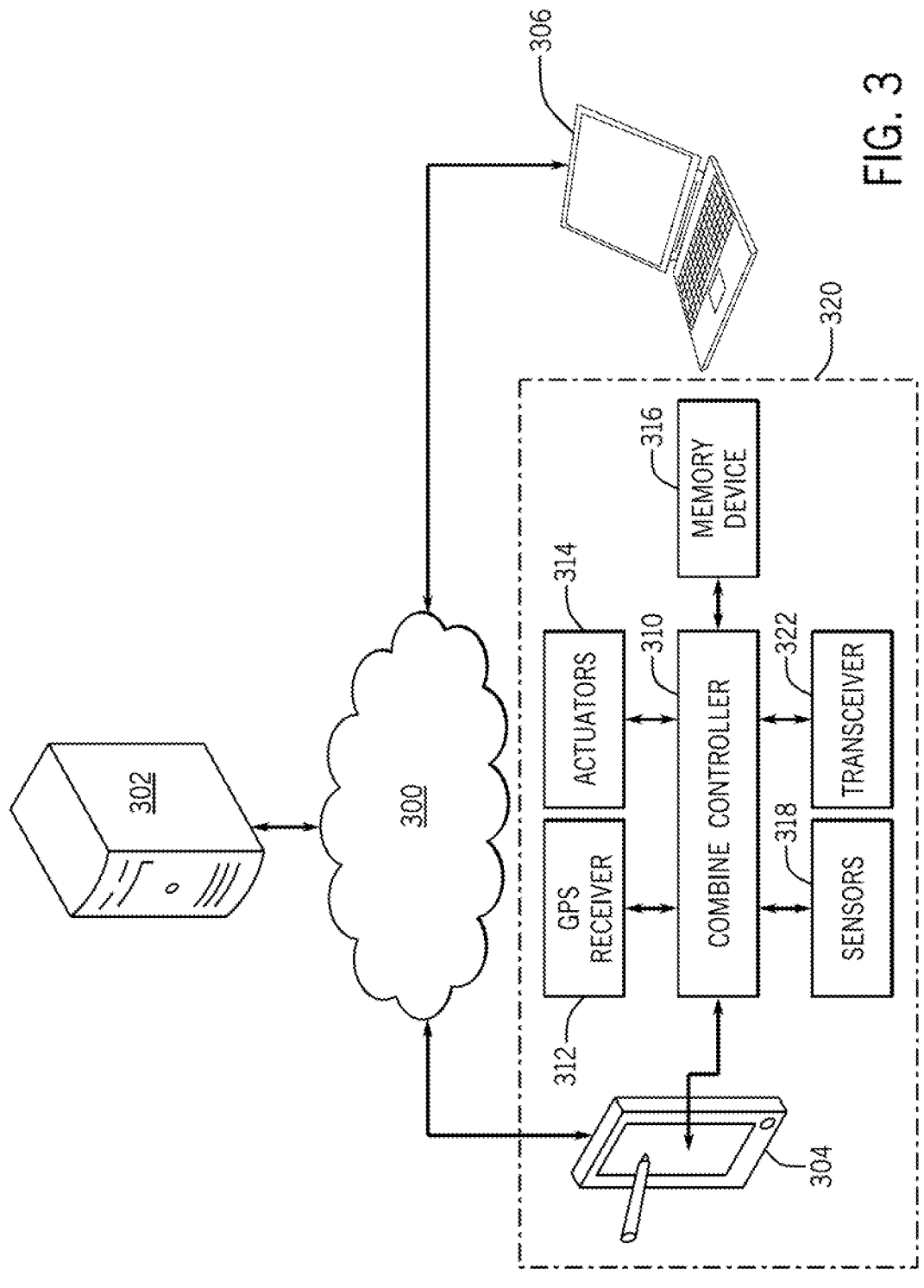
FIG. 3 is a view of the communication between the combine control system including a GPS receiver and an external network.

FIG. 3 shows an example of a system for controlling the combine. The system includes an interconnection between a control system of combine 10, a remote PC 306 and a remote server 302 through network 300 (e.g. Internet). It should be noted that combine 10 does not have to be connected to other devices through a network. The controller of combine 10 can be a standalone system 320 that receives operating instructions through a user interface 304, or through a removable memory device (e.g. Flash Drive). Standalone control system 320 may include user interface 304, controller 310, GPS receiver 312, actuators 314, memory device 316, sensors 318, and transceiver 322.

Controller 310 may be configured to electronically control the operation of one or more components of the combine 10. In general, the controller 310 may comprise any suitable processor-based device known in the art, such as a computing device or any suitable combination of computing devices. Thus, in several embodiments, the controller 310 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 310 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 316 may generally be configured to store suitable computer-readable instructions that, when implemented by the processor(s), configure the controller 310 to perform various computer-implemented functions. In addition, the controller 310 may also include various other suitable components, such as a communications circuit or module, one or more input/output channels, a data/control bus, and/or the like.

The operator uses interface 304 of the combine control system or PC 306 located at remote location 308. Interface 304 and PC 306 allow the operator to view locally stored parameters from memory device 316 and/or download parameters from server 302 through network 300. Combine controller 310 then controls combine 10 based on the instructions. For example, a sensor 318 may be used during harvesting to determine grain tank level. Harvesting may also be tracked and aided by GPS receiver 312.

Figure 4:
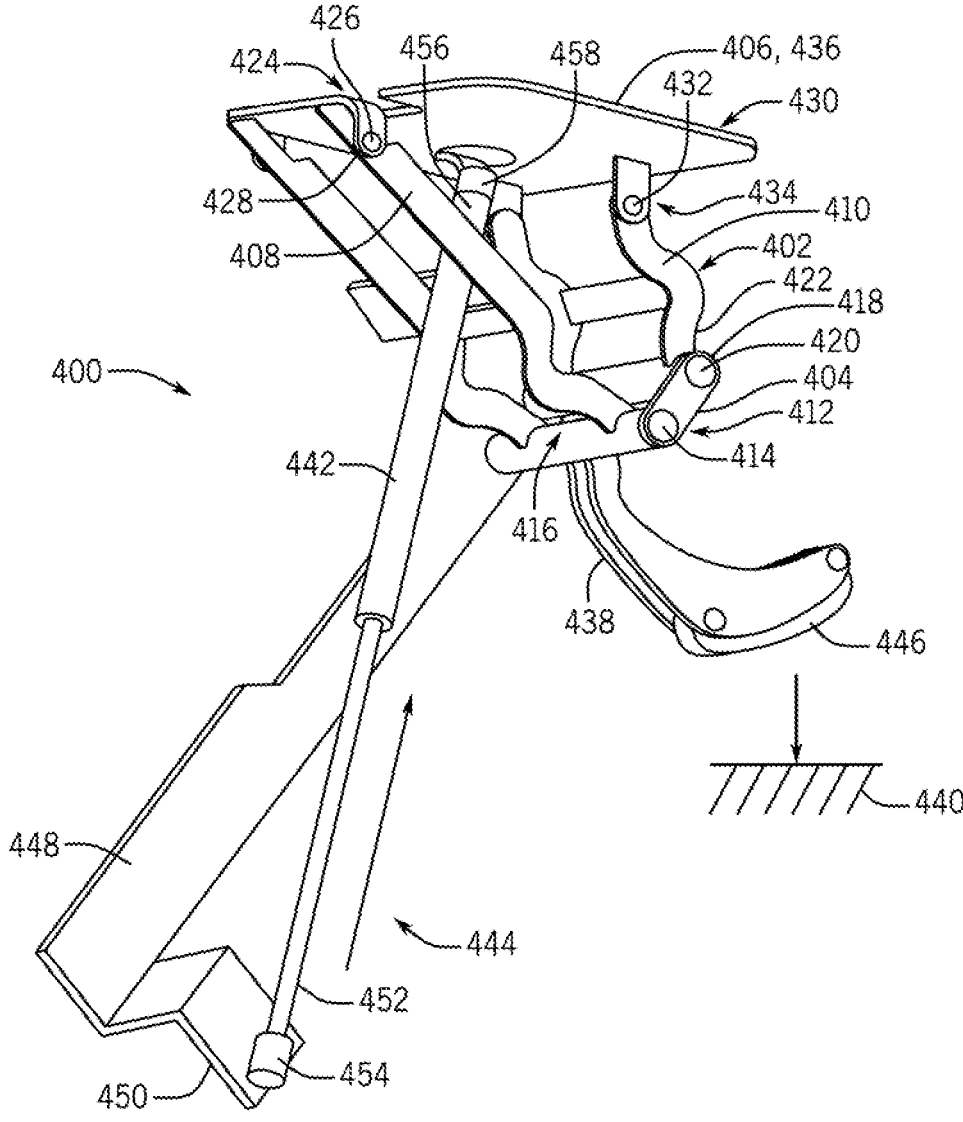
FIG. 4 is a perspective view of a mounting mechanism for a GPS module, shown in an open (deployed) position.

Referring now to FIG. 4, a mounting mechanism 400 for a signal-receiving (i.e., GPS, etc.) module 1200 for an agricultural harvester 10 is shown in an open (deployed) position 444. Mounting mechanism 400 includes a folding four-bar linkage 402, the linkage 402 including a ground link 404, a coupler link 406, a first crank link 408, and a second crank link 410 shorter than the first crank link 408. In the preferred embodiment illustrated in FIG. 4, the mounting mechanism 400 includes two parallel folding four-bar linkages. The folding four-bar linkage 402 is preferably a folding double crank four-bar linkage, more preferably a folding double-crank trapezium (Arglin) linkage with four links connected by four revolute joints (RRRR), wherein the sum of the lengths of the ground and first crank links is less than or equal to the sum of the lengths of the coupler and second crank links (Grashof's Law).

The ground link 404 is joined at a first end 412 by a pivot joint 414 to a first end 416 of the first crank link 408 and at an opposite end 418 by a pivot joint (420) to a first end 422 of the second crank link 410. The ground link 404 is configured to be fixed to a folding cover 202 of a grain tank 28 of the agricultural harvester 10. The coupler link 406 is joined at a first end 424 by a pivot joint 426 to an opposite end 428 of the first crank link 408 and at an opposite end 430 by a pivot joint 432 to an opposite end 434 of the second crank link 410. The coupler link 406 includes a platform 436, which is configured to hold the signal-receiving module 1200. The signal-receiving module may include a GPS signal-receiving unit or a GNSS signal-receiving unit.

One of either the first crank link 408 or the second crank link 410 is provided with a lever 438 that extends past the pivot joint 414, 420 joining the crank link 408, 410 to the ground link 404. The lever 438 is configured to contact a fixed surface 440 on the agricultural harvester 10 to force the mechanism 400 into a folded position 500 (see FIG. 5) from a deployed position 444 as the grain tank cover 202 is moved from an open position 200 to a closed position 1400 (see FIG. 14), preferably with the weight of the grain tank cover 202 alone providing sufficient force to close and fold the mechanism 400. Lever 438 may be provided with a contact or wear plate 446 for engaging the fixed surface 440 on the agricultural harvester 10.

The mechanism 400 in the deployed position 444 holds the signal-receiving module 1200 in a horizontal position above the grain tank cover 202 when the grain tank cover 202 is in the open position 200. The mechanism 400 in the folded position 500 holds the signal-receiving module 1200 in a horizontal position above the grain tank cover 202 when the grain tank cover 202 is in the closed position 1400. The mounting mechanism 400 may further include an actuator 442 configured to force the mechanism 400 into an open position 444 from the folded position 500 as the grain tank cover 202 is moved from a closed position 1400 to an open position 200. The actuator 442 may include a gas strut, a spring, a hydraulic cylinder, an electric motor, or a combination of actuating mechanisms.

As shown in FIG. 4, one ground link 404 of the parallel four-bar linkages 402 is extended lengthwise from pivot joint 414, forming a bracket 448 for fixing mounting mechanism 400 to an outer edge 700 (not shown) of grain tank cover 202 by screws, bolts, clips, or other appropriate fasteners. An extension 450 is provided on bracket 448 to which actuator 442 is joined on a first end 452 by a pivot joint 454. At its opposite end 456, actuator 442 is joined to coupler link 406 by pivot joint 458.

Figure 5:
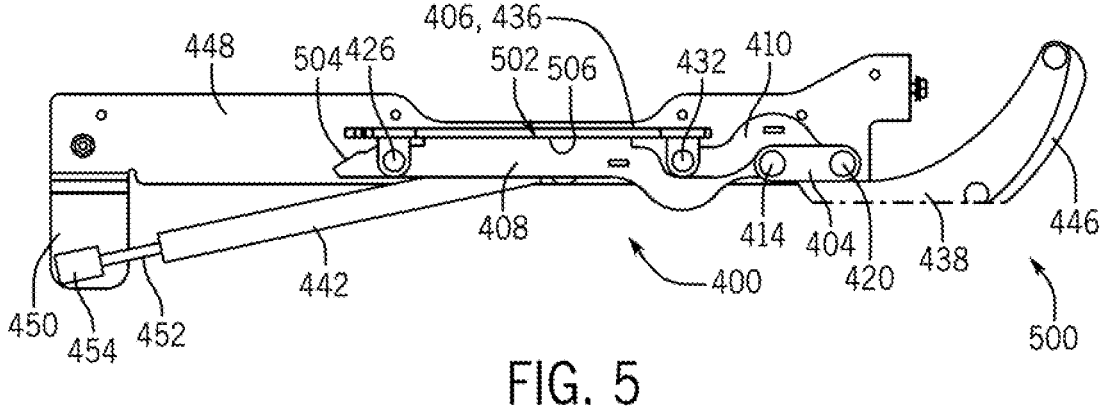
FIG. 5 is a side view of a mounting mechanism for a GPS module, shown in a closed (folded) position.

Referring now to FIG. 5, a mounting mechanism 400 for a GPS module 1200 is shown in a closed (folded) position 500. First crank link 408 is provided with mechanical stops 502, 504 for engaging with coupler link/platform 406, 436 to limit the opening and closing motion of mounting mechanism 400. As seen in FIG. 5, further motion of the mechanism 400 in the closing direction is limited by the stop 502 contacting the underside 506 of coupler link/platform 406, 436.

Figure 6:
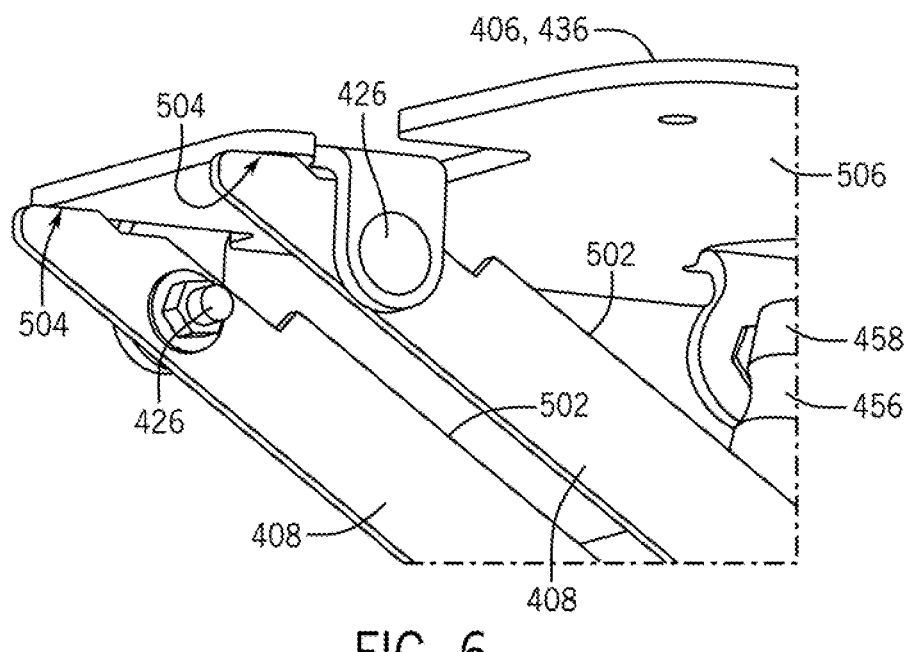
FIG. 6 is a perspective detail of a mounting mechanism for a GPS module, showing the mechanism in a fully opened position and held from further opening by a mechanical stop.

Referring now to FIG. 6, a mounting mechanism 400 for a GPS module is shown in a fully opened position and held from further opening by mechanical stop 504. Stop 504 is formed by extending first crank link 408 beyond pivot 426 and contacts the underside 506 of coupler link/platform 406, 436, where it also extends beyond pivot joint 426 joining the first crank link 408 to the coupler link/platform 406, 436. Stop 504 defines the maximum movement of mounting mechanism 400 in the opening direction, terminating at open (deployed) position 444.

Figure 7:
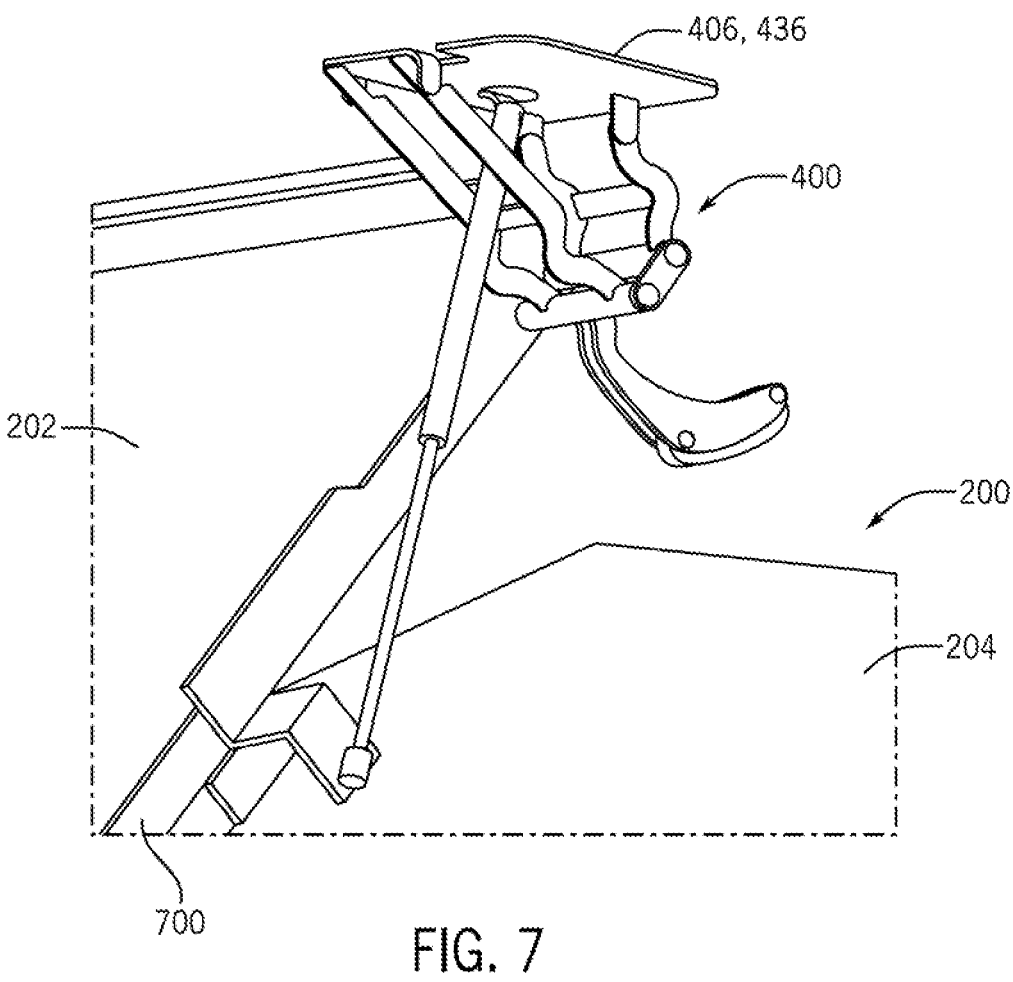
FIG. 7 is a perspective detail of a grain tank cover having a mounting mechanism for a GPS module mounted thereon.

Referring now to FIG. 7, a grain tank cover 202 is shown in detail with a mounting mechanism 400 for a GPS module 1200 fixed by bracket 448 to an outer edge 700 of the cover 202, with the cover 202 and grain tank extension 204 in an open (deployed) position 200. Actuator 442 is fully extended with mounting mechanism 400 in fully open (deployed) position 444, in which coupler link/platform 406, 436 is held in a horizontal position above the highest point of grain tank cover 202 and grain tank extension 204 in the fully open position 444.

Figure 8:
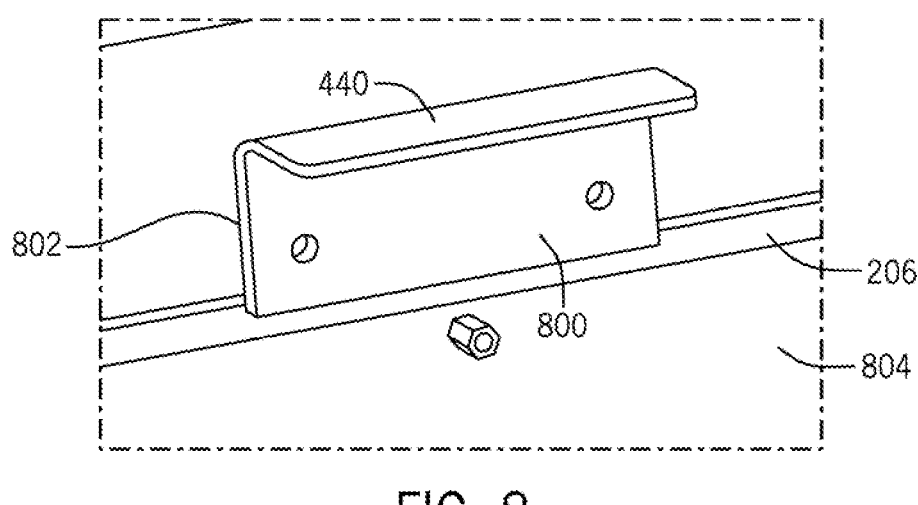
FIG. 8 is a perspective detail of a stop fixed to a top edge of a vertical wall of a grain storage tank for engaging and closing a mounting mechanism for a GPS module.

Referring now to FIG. 8, a stop 800 in the form of an angled bracket 802 is fixed to an upper edge 206 of a vertical wall 804 of the grain storage tank 28. Bracket 802 includes fixed surface 440 extending laterally from wall 804. Stop 800 is positioned on the combine 10 such that lever 438 comes into contact with fixed surface 440 as grain tank cover 202 and extension 204 are moved into the closed position 1400. The force applied to lever 438 by the closing of grain tank cover 202 contracts actuator 442 and moves mounting mechanism 400 into the folded (closed) position 500. In a preferred embodiment, a kit is provided, including the mounting mechanism 400 and the stop 800, enabling after-market installation of the inventive mounting mechanism 400 on combine harvester machines 10 having folding grain tank covers 202 and extensions 204.

Figure 9:
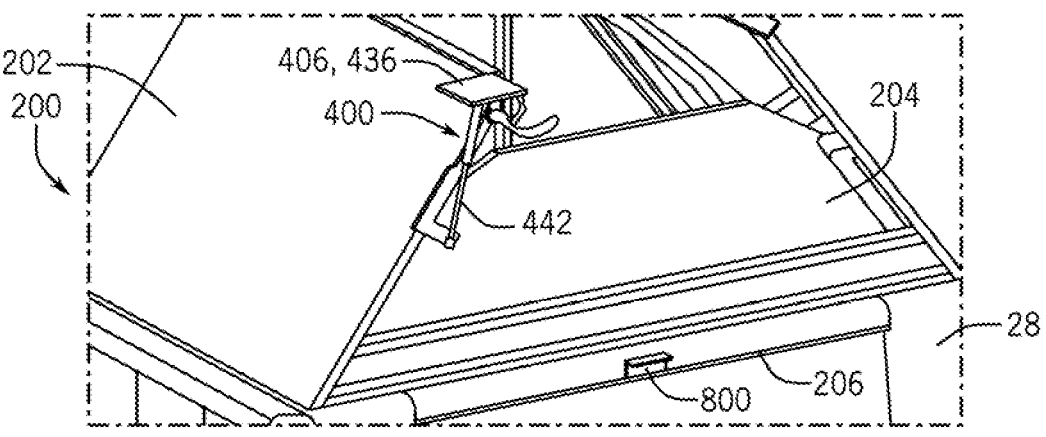
FIG. 9 is a perspective view of a grain storage tank with folding covers and side extensions shown in an open (deployed) position, wherein a mounting mechanism for a GPS module is fixed to a folding cover and a stop for engaging and closing the mounting mechanism is fixed to a side of the grain tank, and wherein the mounting mechanism is in the fully open (deployed) position.

Referring now to FIG. 9, a grain storage tank 28 with folding covers 202 and side extensions 204 is shown in an open (deployed) position 200. Grain storage tank 28 includes mounting mechanism 400 for a GPS module 1200 fixed to folding cover 202 and stop 800 fixed to upper edge 206 of a vertical wall 804 of the tank 28. Actuator 442 is fully extended, and mounting mechanism 400 is in the fully open (deployed) position 444, whereby coupler link/platform 406, 436 are positioned to hold GPS module 1200 in a horizontal position relative to the ground 19, above the highest point of the grain tank cover 202 (and thus the highest point of the combine 10).

Figure 10:
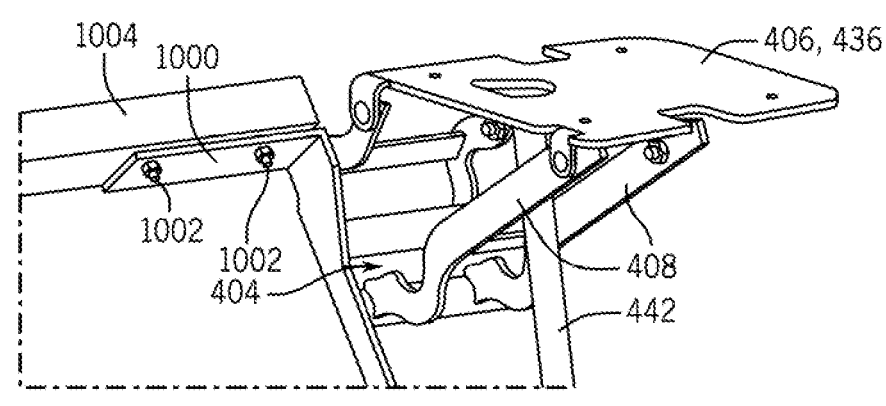
FIG. 10 is a detail of a grain tank cover, showing a mounting mechanism for a GPS module attached thereto.

Referring now to FIG. 10, a reverse view of the grain tank cover 202 shown in FIG. 9 shows in detail the attachment of mounting mechanism 400 to grain tank cover 202. Bracket 100 extends laterally from ground link 404 and is configured to be fixed to a top edge 1004 of grain tank cover 202 using bolts 1002 or another appropriate fastener, such as by screws, clips, adhesive, or other appropriate fastening devices or substances.

Figure 11:
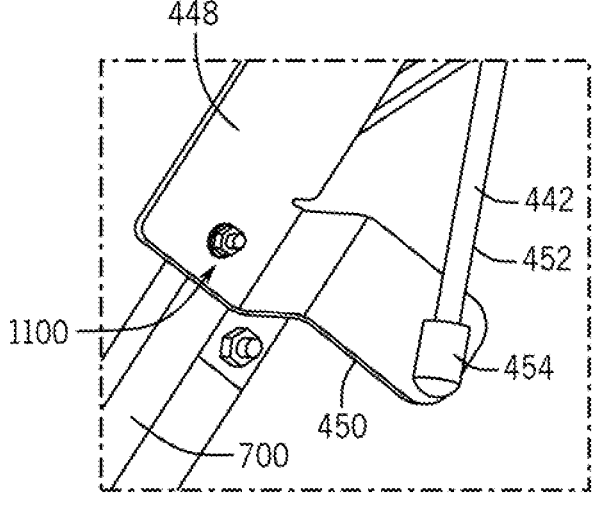
FIG. 11 is a further detail of a grain tank cover, showing a mounting mechanism for a GPS module attached thereto.

Referring now to FIG. 11, the attachment of mounting mechanism 400 to the outer edge 700 of grain tank cover 202 as depicted in FIG. 7 is shown in further detail. Bracket 448 is fixed to outer edge 700 of grain tank cover 202 using bolt 1100, or by screws, clips, adhesive, or other appropriate fastening devices or substances. Extension 450 of bracket 448 is provided to join bracket 448 to actuator 442 on a first end 452 by pivot joint 454.

Figure 12:
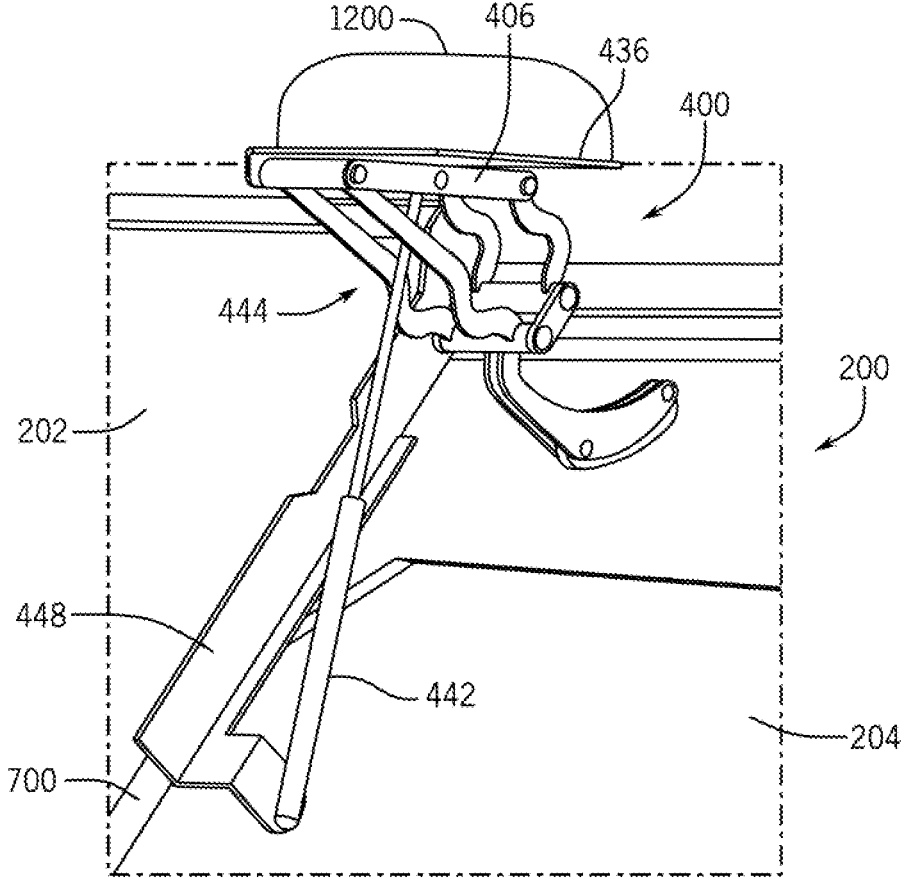
FIG. 12 is a perspective detail of a grain tank cover having a mounting mechanism for a GPS module and a GPS module mounted thereon.
Figures 13, 14:
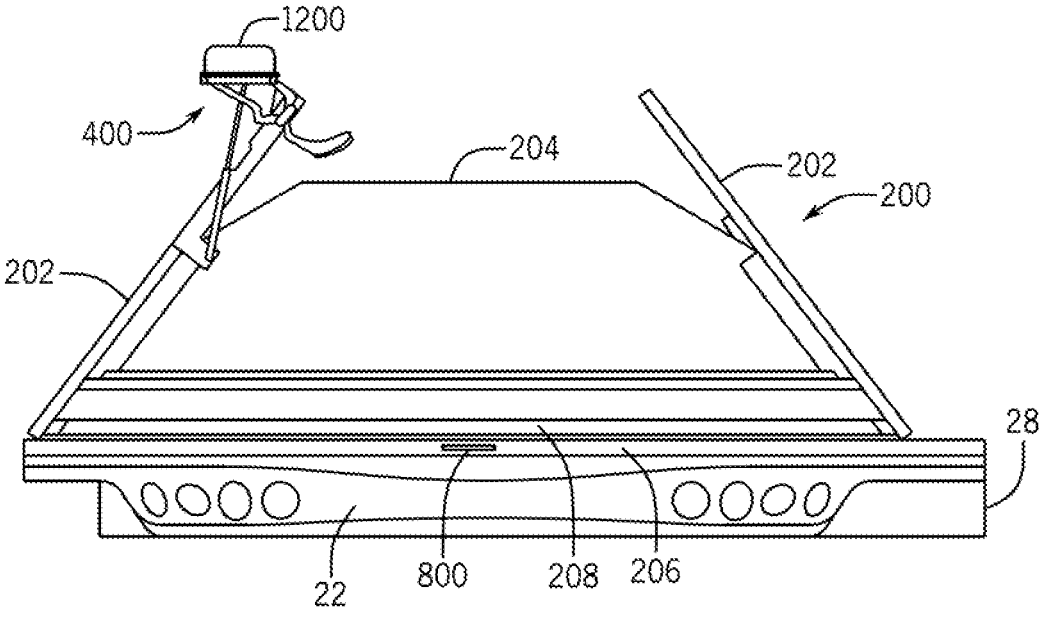
FIG. 13 is a front elevation view of a grain storage tank with folding covers and side extensions shown in an open (deployed) position and a mounting mechanism for a GPS module with a GPS module mounted thereon in a fully open (deployed) position.
FIG. 14 is a front elevation view of a grain storage tank with folding covers and side extensions and a mounting mechanism for a GPS module with a GPS module mounted thereon in a closed (folded) position.

Referring now to FIG. 12, grain tank cover 202 is shown having a mounting mechanism 400 for a GPS module 1200 and a GPS module 1200 mounted thereon. Mounting mechanism 400 for a GPS module 1200 is fixed by bracket 448 to an outer edge 700 of the cover 202, with the cover 202 and grain tank extension 204 in an open (deployed) position 200. Actuator 442 is fully extended, and mounting mechanism 400 is in the fully open (deployed) position 444, whereby coupler link/platform 406, 436 are positioned to hold GPS module 1200 in a horizontal position relative to the ground 19, above the highest point of the grain tank cover 202 (and thus the highest point of the combine 10).

Referring now to FIG. 13, a grain storage tank 28 with folding covers 202 and side extensions 204 shown in an open (deployed) position 200 and a mounting mechanism 400 for a GPS module 1200 as depicted in FIG. 2 are shown with a GPS module 1200 mounted thereon in a fully open (deployed) position 444. The covers 202 typically represents the highest or one of the highest points on the combine 10 relative to a surface 19 (FIG. 1), such as the ground or a road surface, on which the combine 10 is located. Mounting mechanism 400 in the deployed position 444 holds GPS module 1200 in a horizontal orientation relative to the surface 19 and above the highest structures of the combine 10 to minimize interference with signal receiving by the module 1200.

Referring now to FIG. 14, the grain storage tank 28 with folding covers 202 and side extensions 204 depicted in FIG. 13 is shown in a closed position, with mounting mechanism 400 with a GPS module 1200 mounted thereon in the closed (folded) position 500. Mounting mechanism 400 in the folded position 500 maintains GPS module 1200 in a horizontal orientation relative to the surface 19 and above the highest structures of the combine 10 to minimize interference with signal receiving by the module 1200.

One exemplary embodiment provides a mounting mechanism (400) for a signal-receiving module (1200) for an agricultural harvester (10), comprising a folding four-bar linkage (402), the linkage (402) including a ground link (404), a coupler link (406), a first crank link (408), and a second crank link (410) shorter than the first crank link (408), wherein:

the ground link (404) is joined at a first end (412) by a pivot joint (414) to a first end (416) of the first crank link (408) and at an opposite end (418) by a pivot joint (420) to a first end (422) of the second crank link (410), the ground link (404) configured to be fixed to a folding cover (202) of a grain tank (28) of the agricultural harvester (10);

the coupler link (406) is joined at a first end (424) by a pivot joint (426) to an opposite end (428) of the first crank link (408) and at an opposite end (430) by a pivot joint (432) to an opposite end (434) of the second crank link (410), the coupler link (406) including a platform (436) configured to hold the signal-receiving module (1200);

one of either the first crank link (408) or the second crank link (410) comprises a lever 438 extending past the pivot joint (414, 420) joining the crank link (408, 410) to the ground link (404), the lever (438) configured to contact a fixed surface (440) on the agricultural harvester (10) to force the mechanism (400) into a folded position (500) from a deployed position (444) as the grain tank cover (202) is moved from an open position (200) to a closed position (1400);

the mechanism (400) in the deployed position (444) holds the signal receiving module (1200) in a horizontal position above the grain tank cover (202) when the grain tank cover (202) is in the open position (200); and the mechanism (400) in the folded position (500) holds the signal receiving module (1200) in a horizontal position above the grain tank cover (202) when the grain tank cover (202) is in the closed position (1400).

A further exemplary embodiment provides a mounting mechanism (400), wherein the signal-receiving module (1200) includes a GPS module or a GNSS module.

A further exemplary embodiment provides a mounting mechanism (400), further including an actuator (442) configured to force the mechanism (400) into an open position (444) from the folded position (500) as the grain tank cover (202) is moved from a closed position (1400) to an open position (200).

A further exemplary embodiment provides a mounting mechanism (400), wherein the actuator (442) includes a gas strut, a spring, or a hydraulic actuator.

A further exemplary embodiment provides a kit, including the mounting mechanism (400) and a stop (800) including the fixed surface (440), the stop (800) configured to be fixed to the agricultural harvester (10) in a position such that the lever (438) contacts the fixed surface (440) as the grain tank cover (202) is moved from an open position (200) to a closed position (1400).

A further exemplary embodiment provides a kit, wherein the stop (800) includes an angled bracket (802) configured to be fixed to a side (804) of the grain tank (28).

A further exemplary embodiment provides a grain tank (28) for an agricultural harvester (10), including the mounting mechanism (400) fixed to a folding cover (202) of the grain tank (28) and a signal-receiving module (1200) mounted on the platform (436).

A further exemplary embodiment provides a grain tank (28), wherein the signal-receiving module (1200) includes a GPS module or a GNSS module.

A further exemplary embodiment provides a grain tank (28), wherein the mounting mechanism (400) includes an actuator (442) configured to force the mechanism (400) into an open position (444) from the folded position (500) as the grain tank cover (202) is moved from a closed position (1400) to an open position (200).

A further exemplary embodiment provides a grain tank (28), wherein the actuator (442) includes a gas strut, a spring, or a hydraulic actuator.

A further exemplary embodiment provides an agricultural harvester (10) including a grain storage tank (28) having a folding grain tank cover (202), wherein the cover (202) includes a mounting mechanism (400) for a signal-receiving module (1200) for the agricultural harvester (10), the mechanism (400) including a folding four-bar linkage (402), the linkage (402) including a ground link (404), a coupler link (406), a first crank link (408), and a second crank link (410) shorter than the first crank link (408), wherein:

the ground link (404) is joined at a first end (412) by a pivot joint (414) to a first end (416) of the first crank link (408) and at an opposite end (418) by a pivot joint (420) to a first end (422) of the second crank link (410), the ground link (404) being fixed to the folding cover (202) of a grain tank (28);

the coupler link (406) is joined at a first end (424) by a pivot joint (426) to an opposite end (428) of the first crank link (408) and at an opposite end (430) by a pivot joint (432) to an opposite end (434) of the second crank link (410), the coupler link (406) including a platform (436) configured to hold the signal-receiving module (1200);

one of either the first crank link (408) or the second crank link (410) includes a lever (438) extending past the pivot joint (414, 420) joining the crank link (408, 410) to the ground link (404), the lever (438) configured to contact a fixed surface (440) on the agricultural harvester (10) to force the mechanism (400) into a folded position (500) from a deployed position (444) as the grain tank cover (202) is moved from an open position (200) to a closed position (1400);

the mechanism (400) in the deployed position (444) holds the signal receiving module (1200) in a horizontal position above the grain tank cover (202) when the grain tank cover (202) is in the open position (200); and the mechanism (400) in the folded position (500) holds the signal receiving module (1200) in a horizontal position above the grain tank cover (202) when the grain tank cover (202) is in the closed position (1400).

A further exemplary embodiment provides an agricultural harvester (10), wherein the signal-receiving module (1200) includes a GPS module or a GNSS module.

A further exemplary embodiment provides an agricultural harvester (10), wherein the mounting mechanism (400) further includes an actuator (442) configured to force the mechanism (400) into an open position (444) from the folded position (500) as the grain tank cover (202) is moved from a closed position (1400) to an open position (200).

A further exemplary embodiment provides an agricultural harvester (10), wherein the actuator (442) includes a gas strut, a spring, or a hydraulic actuator.

A further exemplary embodiment provides an agricultural harvester (10), wherein a stop (800) including the fixed surface (440) is fixed to the agricultural harvester (10) in a position such that the lever (438) contacts the fixed surface (440) as the grain tank cover (202) is moved from an open position (200) to a closed position (1400).

What is claimed is:

1. A mounting mechanism for a signal-receiving module for an agricultural harvester, said mounting mechanism comprising:

a folding four-bar linkage, the linkage comprising a ground link, a coupler link, a first crank link, and a second crank link shorter than the first crank link, wherein the ground link is joined at a first end by a pivot joint to a first end of the first crank link and at an opposite end by a pivot joint to a first end of the second crank link, the ground link configured to be fixed to a folding cover of a grain tank of the agricultural harvester;

wherein the coupler link is joined at a first end by a pivot joint to an opposite end of the first crank link and at an opposite end by a pivot joint to an opposite end of the second crank link, the coupler link comprising a platform configured to hold the signal-receiving module;

wherein one of either the first crank link or the second crank link comprises a lever extending past the pivot joint joining the crank link to the ground link, the lever configured to contact a fixed surface on the agricultural harvester to force the mechanism into a folded position from a deployed position as the grain tank cover is moved from an open position to a closed position;

wherein the mechanism in the deployed position holds the signal receiving module in a horizontal position above the grain tank cover when the grain tank cover is in the open position; and wherein the mechanism in the folded position holds the signal-receiving module in a horizontal position above the grain tank cover when the grain tank cover is in the closed position.

2. The mounting mechanism according to claim 1, wherein the signal-receiving module comprises a GPS module or a GNSS module.

3. The mounting mechanism according to claim 1, further comprising an actuator configured to force the mechanism into an open position from the folded position as the grain tank cover is moved from a closed position to an open position.

4. The mounting mechanism according to claim 3, wherein the actuator comprises a gas strut, a spring, or a hydraulic actuator.

5. A kit, comprising the mounting mechanism according to claim 1 and a stop comprising the fixed surface, the stop configured to be fixed to the agricultural harvester in a position such that the lever contacts the fixed surface as the grain tank cover is moved from the open position to the closed position.

6. The kit according to claim 5, wherein the stop comprises an angled bracket configured to be fixed to a side of the grain tank.

7. A grain tank for an agricultural harvester, comprising the mounting mechanism according to claim 1 fixed to a folding cover of the grain tank and a signal-receiving module mounted on the platform.

8. The grain tank according to claim 7, wherein the signal-receiving module comprises a GPS module or a GNSS module.

9. The grain tank according to claim 7, wherein the mounting mechanism comprises an actuator configured to force the mechanism into an open position from the folded position as the grain tank cover is moved from the closed position to the open position.

10. The grain tank according to claim 9, wherein the actuator comprises a gas strut, a spring, or a hydraulic actuator.

11. An agricultural harvester comprising a grain storage tank having a folding grain tank cover, wherein the cover comprises a mounting mechanism for a signal-receiving module for the agricultural harvester, wherein the mechanism comprises a folding four-bar linkage, the linkage comprising a ground link, a coupler link, a first crank link, and a second crank link shorter than the first crank link, wherein the ground link is joined at a first end by a pivot joint to a first end of the first crank link and at an opposite end by a pivot joint to a first end of the second crank link, the ground link being fixed to the folding cover of a grain tank;

wherein the coupler link is joined at a first end by a pivot joint to an opposite end of the first crank link and at an opposite end by a pivot joint to an opposite end of the second crank link, the coupler link comprising a platform configured to hold the signal-receiving module;

wherein one of either the first crank link or the second crank link comprises a lever extending past the pivot joint joining the crank link to the ground link, the lever configured to contact a fixed surface on the agricultural harvester to force the mechanism into a folded position from a deployed position as the grain tank cover is moved from an open position to a closed position;

wherein the mechanism in the deployed position holds the signal receiving module in a horizontal position above the grain tank cover when the grain tank cover is in the open position; and wherein the mechanism in the folded position holds the signal-receiving module in a horizontal position above the grain tank cover when the grain tank cover is in the closed position.

12. The agricultural harvester according to claim 11, wherein the signal-receiving module comprises a GPS module or a GNSS module.

13. The agricultural harvester according to claim 11, wherein the mounting mechanism further comprises an actuator configured to force the mechanism into an open position from the folded position as the grain tank cover is moved from the closed position to the open position.

14. The agricultural harvester according to claim 13, wherein the actuator comprises a gas strut, a spring, or a hydraulic actuator.

15. The agricultural harvester according to claim 11, wherein a stop comprising the fixed surface is fixed to the agricultural harvester in a position such that the lever contacts the fixed surface as the grain tank cover is moved from the open position to the closed position.

* * * * *